(12) United States Patent
Materne et al.

(10) Patent No.: US 6,458,871 B2
(45) Date of Patent: Oct. 1, 2002

(54) PREPARATION OF STARCH REINFORCED RUBBER AND USE THEREOF IN TIRES

(75) Inventors: Thierry Florent Edmé Materne, Fairlawn, OH (US); Filomeno Gennaro Corvasce, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/850,980

(22) Filed: May 8, 2001

Related U.S. Application Data

(62) Division of application No. 09/176,855, filed on Oct. 22, 1998, now Pat. No. 6,273,163.

(51) Int. Cl.$^7$ .................................................. C08L 5/16
(52) U.S. Cl. ............................ 524/47; 524/48; 524/51; 524/52; 525/332.6; 525/343
(58) Field of Search .............................. 524/47, 48, 51, 524/52; 525/332.6, 343

(56) References Cited

FOREIGN PATENT DOCUMENTS

EP          0795581          3/1997

*Primary Examiner*—Bernard Lipman
(74) *Attorney, Agent, or Firm*—Henry C. Young, Jr.

(57) ABSTRACT

The invention relates to the preparation of a rubber composition containing starch/plasticizer composite reinforcement, together with at least one additional reinforcing filler, through the utilization of a combination of an organosilane disulfide compound mixed with a rubber composition in a preparatory, non-productive, mixing stage(s) followed by adding an organosilane polysulfide compound in a subsequent, productive, mixing stage. The invention further relates to the resulting rubber composition and use thereof in rubber products, including tires.

20 Claims, No Drawings

PREPARATION OF STARCH REINFORCED RUBBER AND USE THEREOF IN TIRES

This is a Divisional of parent application Ser. No. 09/176,855, filed on Oct. 22, 1998, now U.S. Pat. No. 6,273,163.

FIELD

This invention relates to the preparation of rubber compositions which contain a starch/plasticizer composite reinforcement, together with at least one additional reinforcing filler, and an organosilane disulfide compound added in a non-productive mixing stage(s) and followed by mixing an organosilane polysulfide compound in a subsequent, productive, mixing stage.

The invention also relates to the preparation of rubber compositions and particularly tires having at least one component such as a tread thereof.

BACKGROUND

Starch has sometimes been suggested for use in elastomer compositions for various purposes, including tires, particularly as a starch/plasticizer composite. For example, see U.S. Pat. No. 5,672,639.

Such starch composites may be used in combination with various other fillers, particularly reinforcing fillers for elastomers such as, for example, carbon black, silica, vulcanized rubber particles, short polymeric fibers, kaolin clay, mica, talc, titanium dioxide and limestone. Carbon black and/or silica, particularly precipitated silica, may be preferred. Such short fibers may be, for example, fibers of cellulose, aramid, nylon, aramid, polyester and carbon composition.

U.S. Pat. Nos., for example, 5,403,923; 5,374,671; 5,258,430 and 4,900,361 disclose a preparation and use of various starch materials.

As pointed in the aforesaid U.S. Pat. No. 5,672,639, starch is typically represented as a carbohydrate polymer having repeating units of amylose (anydroglucopyranose units joined by glucosidic bonds) and amylopetin, a branched chain structure, as is well known to those having skill in such art. Typically, starch may be composed of about 25 percent amylose and about 75 percent amylopectin. (*The Condensed Chemical Dictionary, Ninth Edition* (1977)), revised by G. G. Hawley, published by Van Nostrand Reinhold Company, page 813). Starch can be, reportedly, a reserve polysaccharide in plants such as, for example, corn, potatoes, rice and wheat as typical commercial sources.

While starch may have been previously suggested for use in rubber products, starch by itself, typically having a softening point of about 200° C. or above, is considered herein to have a somewhat limited use in many rubber products, primarily because rubber compositions are normally processed by preliminarily blending rubber with various ingredients at temperatures in a range of about 140° C. to about 170° C., usually at least about 160° C., and sometimes up to 180° C. which is not a high enough temperature to cause the starch (with softening temperature of at least about 200° C.) to effectively melt and efficiently blend with the rubber composition. As a result, the starch particles tend to remain in individual domains, or granules, within the rubber composition rather than as a more homogeneous blend.

Thus, it is considered herein that such softening point disadvantage has rather severely limited the use of starch as a filler, particularly as a reinforcing filler, for many rubber products.

It is considered herein that use of a starch/plasticizer composite, or composition, with a softening point significantly lower than that of the starch alone may allow the starch to be more easily mixed and processed in conventional elastomer processing equipment. Such composites, as pointed in the aforesaid U.S. Pat. No. 5,672,639, may be, for example, a composite of starch and plasticizer.

A silica coupler may be used in conjunction with such starch composite and with silica, such as precipitated silica, to enhance the reinforceability, as pointed out in U.S. Pat. No. 5,672,639 which has a moiety reactive with the surface of the silica (i.e.: silicon hydroxide) and the surface of the starch composite and another moiety interactive with a sulfur-curable elastomer.

Coupling agents such as, for example, an organosilane polysulfide having an average of from 3.5 to 4 sulfur atoms in its polysulfidic bridge has been used for coupling precipitated silica to elastomers.

Exemplary of such organosilane polysulfide is bis-3 (triethoxysilylpropyl) polysulfide with an average of about 3.8 sulfur atoms in its polysulfidic bridge. It is envisioned that such polysulfide can be a sulfur donor, by liberating free sulfur, during typical high shear mixing of a rubber composition at an elevated temperature such as, for example, at temperatures of 100° C. and above, depending somewhat upon the polysulfide used and the mixing temperature and time.

The small amount of free, liberated, sulfur is then available to combine with and/or possibly partially vulcanize, a diene-based elastomer.

It is, however, considered herein that an organosilane polysulfide blend, which is primarily a disulfide having an average of about 2.6 or less sulfur atoms in its polysulfidic bridge, is not normally a good sulfur donor under such mixing conditions, due to the relatively strong sulfur-to-sulfur bonds typical of an organosilane disulfide—as compared to an organosilane polysulfide with an average of at least 3.5 sulfur atoms in its polysulfidic bridge.

Accordingly, it is considered herein that, for an organosilane polysulfide which contains an average of less than 2.8 and particularly within a range of about 2 to about 2.6, sulfur atoms in its polysulfidic bridge, the liberation of free sulfur, if any, occurs at a relatively slow rate during a high shear rubber mixing stage, even at a mixing temperature in a range of about 150° C. to about 185° C. depending somewhat upon the overall mixing conditions, including the mixing time itself.

Bis-(3-triethoxysilylpropyl) disulfide, as a variety of organosilane disulfide, is also taught as being useful in silica-containing sulfur-vulcanizable elastomer compositions, even as a high purity form of such disulfide in, for example, U.S. Pat. No. 4,046,550 and German Patent Publication DT 2,360,471. However, it is considered herein that such disulfide does not ordinarily readily liberate free sulfur in such aforementioned rubber/silica/coupler mixing operation.

For examples of organosilane polysulfides for use as silica couplers, see U.S. Pat. Nos. 4,076,550; 4,704,414; and 3,873,489.

For examples of organosilane disulfides added in a preparatory, non-productive, rubber composition mixing stage, along with a small amount of free sulfur, see U.S. Pat. Nos. 4,076,550; 5,580,919 and 5,674,932.

In practice, sulfur-vulcanized elastomer products are typically prepared by thermomechanically mixing rubber and various ingredients in a sequentially step-wise manner followed by shaping and curing the compounded rubber to form a vulcanized product.

First, for the aforesaid mixing of the rubber and various ingredients, typically exclusive of free sulfur and sulfur vulcanization accelerators, the elastomer(s) and various rubber compounding ingredients are typically blended in at least one, and usually at least two, sequential, preparatory thermomechanical mixing stage(s) in suitable mixers, usually internal rubber mixers. Such preparatory mixing is often referred to as "non-productive mixing", or "non-productive mixing steps or stages". Such preparatory mixing is usually conducted at temperatures in a range of about 140° C. to 190° C. and more often in a range of about 140° C. or 150° C. to about 185° C.

Subsequent to such sequential, preparatory mix stage(s), free sulfur and sulfur vulcanization accelerators, and possibly one or more additional ingredients, are mixed with the rubber compound, or composition, in a final, productive, mix stage, typically at a temperature within a range of about 100° C. to about 130° C., which is a lower temperature than the temperatures utilized in the aforesaid preparatory mix stage(s) in order to prevent or retard premature curing of the sulfur-curable rubber, which is sometimes referred to as "scorching", of the rubber composition.

Such sequential, non-productive, mixing steps, and the subsequent productive mixing step are well known to those in the rubber mixing art.

By thermomechanical mixing, it is meant that the rubber compound, or composition of rubber and rubber compounding ingredients, is mixed in a rubber mixture under high shear conditions where it autogeneously heats up, with an accompanying temperature rise, as a result of the mixing primarily due to shear and associated friction within the rubber mixture in the rubber mixer.

Such thermomechanical rubber compound mixing procedure and associated shear and accompanying temperature rise aspects are well known to those having experience in the rubber preparation and mixing art.

In practice, it is believed that the inventors' prescribed procedure of (1) adding an organosilane disulfide compound in a non-productive rubber composition mixing stage, or step, followed by (2) subsequently adding an organosilane polysulfide compound with a average of from 3.5 to 4.5 sulfur atoms in its polysulfidic bridge together with a small amount of free sulfur in a productive rubber composition mixing stage for a combination of starch composite and silica-based reinforced rubber composition, particularly as a means of controlling the associated sulfur/elastomer interaction as well as interaction with a silane/starch, as well as additional silane/filler (ie: silane/silica) composite network product created by the reaction of the organosilane component of the organosilane disulfide compound with the starch composite reinforcement and with the silica-based reinforcement in the prior, preparatory, mixing stage(s), is novel and inventive in view of past practice.

In one aspect, it is believed that a decoupling of an initial silane/starch composite and silane/silica reaction (via the organosilane component of the organosilane disulfide compound) and a subsequent release of free sulfur, and additional silane reaction, (via the subsequent addition of the organosilane polysulfide compound) to interact with the elastomer(s) in a sequential rubber composition mixing procedure is accomplished by using a combination of separate and selective addition of an organosilane disulfide compound (I) and subsequent addition of an organosilane polysulfide compound (II) followed by vulcanizing the rubber composition according to the procedure of this invention is a significant departure from past practice.

In the description of this invention, the organosilane disulfide compound is used to describe an organosilane polysulfide compound having an average of from 2 to about 2.6 sulfur atoms in its polysulfidic bridge and the organosilane polysulfide compound is used to describe an organosilane polysulfide compound having an average of from about 3.5 to about 4.5 sulfur atoms in its polysulfidic bridge.

The term "phr" as used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms such as "rubber composition", "compounded rubber" and "rubber compound", if used herein, are used interchangeably to refer to "rubber which has been blended or mixed with various ingredients and materials" and "rubber compounding" or "compounding" may be used to refer to the "mixing of such materials". Such terms are well known to those having skill in the rubber mixing or rubber compounding art.

A reference to an elastomer's "Tg", if used herein, refers to a "glass transition temperature" which can be determined by a differential scanning calorimeter at a heating rate of 10° C. per minute.

SUMMARY AND PRACTICE OF THE INVENTION

In accordance with this invention, a process of preparing a rubber composition comprises the steps of:

(A) thermomechanically mixing in at least one preparatory mixing stage and to a temperature within a range of about 150° C. to about 185° C. and in the absence of addition of free sulfur (1) 100 parts by weight of at least one diene-based elastomer selected from conjugated diene homopolymers and copolymers and copolymers of at least one conjugated diene and aromatic vinyl compound, (2) about 30 to about 100, alternatively about 30 to about 90, phr of particulate filler comprised of (a) about 4 to about 90, alternatively about 5 to about 20, weight percent starch/plasticizer composite, (b) about 96 to about 10, alternatively about 95 to about 80, weight percent of at least one additional reinforcing filler selected from carbon black, alumina and silica-based fillers selected from at least one of precipitated silica, aluminosilicate, and modified carbon black containing silicon hydroxide on its surface; wherein said starch is comprised of amylose units and amylopectin units in a ratio of about 15/85 to about 35/65 and has a softening point according to ASTM No. D1228 in a range of about 180° C. to about 220° C. and where said starch/plasticizer composite has a softening point in a range of about 110° C. to about 170° C. according to ASTM No. D1228, and (3) about 0.05 to about 20, alternatively about 0.05 to about 10, parts by weight per part by weight of said starch/plasticizer composite, alumina and silica-based filler of at least one organosilane disulfide compound of the formula (I):

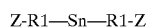   (I)

followed by:

B) mixing therewith in a subsequent mixing step to a temperature within in a range of about 100° C. to about 130° C., at least one organosilane polysulfide compound of the formula (II) and free sulfur; wherein the total of free sulfur addition and about fifty percent of the sulfur in the polysulfidic bridge of said polysulfide sulfur donor is in a range of about 0.93 to about 4, alternatively about 0.93 to about 2.8, phr

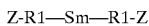 (II)

wherein, n is a number in a range of from 2 to about 6 and the average for n is within a range of from about 2 to 2.6;

wherein m is a number of from 2 to about 8 and the average for m is within a range of about 3.5 to about 4.5;

wherein Z is selected from the group consisting of:

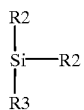 (Z1)

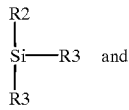 (Z2)

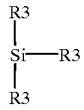 (Z3)

wherein R2 may be the same or different and is individually selected from the group consisting of alkyl group having 1 to 4 carbons and phenyl, preferably from methyl and ethyl radicals; R3 may be the same or different and is individually selected from the group consisting of alkyl groups having 1 to 4 carbon atoms, phenyl, alkoxy groups having 1 to 8 carbon atoms and cycloalkoxy groups with 5 to 8 carbon atoms, preferably from methyl and ethyl groups; and R1 is selected from the group consisting of a substituted or unsubstituted alkyl group having a total of 1 to 18 carbon atoms and a substituted or unsubstituted aryl group having a total of 6 to 12 carbon atoms.

In practice, between each mixing step the rubber composition is allowed to cool to a temperature below about 40° C. such as, for example, within a range of about 40° C., to about 20° C.

In practice, the total mixing time for said preparatory (non-productive) mixing steps may be in a range of about two to about 20, alternatively about four to about 15, minutes and about one to about three minutes for said subsequent (productive) mixing step.

For said formula (I), the organosilane polysulfide compound is, primarily, an organosilane disulfide as a mixture of organosilane polysulfides, in which at least 55, usually at least 65, percent of n is 2, and preferably about 80 to about 100 percent, of n is 2.

For said formula (II), the organosilane polysulfide compound is a mixture of organosilane polysulfides in which at least 70 percent, and preferably about 80 to about 100 percent, of m is in a range of about 3.5 to about 4.5.

In one aspect, the organosilane polysulfide compound of formula (II) has a property of releasing at least a portion of its sulfur at a temperature in a range of about 150° C. to about 185° C. In particular, it may be considered, depending upon the selection and amount used of an organosilane polysulfide compound, that the free sulfur released from said organosilane polysulfide compound (formula II) during the molding and curing of the rubber composition at an elevated temperature in a range of about 140° C. to about 185° C. may, for example, be within a range of about 0.13 to about one phr.

An overall philosophy of this invention is considered herein to be in a sense of separately and selectively first promoting an initial silane reaction with the reinforcing fillers, including the starch/plasticizer composite, without appreciable premature release of free sulfur and then, subsequently, promoting both a release of free sulfur and a further silane reaction with the product of the first silane reaction. A particular benefit is seen that preventing a premature release of free sulfur enables a lower viscosity of the rubber composition even under high severity mixing conditions required for a maximization of filler dispersion and polymer-filler interaction. A further benefit is a later combination of free sulfur generation coupled with a subsequent and additional silane reaction.

This is accomplished by the manipulation of first mixing the organosilane disulfide compound (I) with the elastomer(s) and reinforcing fillers, including the starch composite, followed by subsequently and separately mixing the organosilane polysulfide compound (II) with the rubber and silane-filler network product.

It is considered that such process is novel and a significant departure from past practice.

In practice, then, a viscosity build-up of the rubber composition during its preparatory, non-productive, mixing stage(s) due to a premature partial vulcanization due to a release of free sulfur from a organosilane polysulfide (II) having an average of about 3.5 to about 4.5 sulfur atoms in its polysulfidic bridge is avoided. However, the benefits of the reaction of the organosilane component of the organosilane disulfide compound (I) with the reinforcing fillers, including the starch/plasticizer composite, is still obtained.

By then subsequently adding the organosilane polysulfide compound in the productive stage at lower temperature mixing conditions and allowing the added organosilane polysulfide compound to aid in the vulcanization of the rubber composition both by releasing free sulfur at the higher curing temperature and allowing the silane portion of organosilane polysulfide compound (II) to interact with the previously created organosilane/starch-plasticizer composite and the organosilane/filler (ie: silane/silica and/or silane/aluminosilicate) composite, or network of such composites.

This aspect of the invention, as it is understood, is accomplished by first utilizing an organosilane disulfide compound (I) which has an active silane moiety but does not appreciably release free sulfur so that free sulfur is not liberated during the preliminary, non-productive, mixing stage(s) and so that sulfur can then be later and separately added via the hereinbefore described organosilane polysulfide compound (II) in the vulcanization of the rubber composition. In this manner, the benefits of initially and selectively reacting the silane portion of the organosilane disulfide compound with the starch composite and silica-based filler is obtained but delaying the release of free sulfur, and additional silane interaction until after both the initial preliminary non-productive mixing step(s) at the higher mixing temperature and the subsequent, productive, mixing step at the lower mixing temperature and until the vulcanization of the rubber composition at the higher temperature.

In one aspect of the invention, such process is provided wherein said preparatory mixing is conducted in at least two sequential thermomechanical mixing steps of which at least two of such mixing steps are to a temperature in a range of about 140° C. to about 185° C., with intermediate cooling of the rubber composition between at least two of said mixing steps to a temperature below about 40° C.

In further accordance with this invention, a rubber composition is provided as being prepared according to the method of this invention.

In additional accordance with this invention, an article is provided having at least one component of said rubber composition.

In further accordance with this invention, a tire is provided having at least one component of said rubber composition.

In additional accordance with this invention, a tire is provided having a tread of said rubber composition, particularly where said tire tread is designed to be ground-contacting.

In one aspect, the prepared rubber composition is vulcanized in a suitable mold at an elevated temperature in a range of about 140° C. to about 185° C. or 190° C.

In additional accordance with the invention, the process comprises the additional steps of preparing an assembly of a tire of sulfur vulcanizable rubber with tread comprised of the said rubber composition prepared according to the process of this invention and vulcanizing the assembly at a temperature in a range of about 140° C. to about 185° C. or 190° C.

Accordingly, the invention also thereby contemplates a vulcanized tire prepared by such process.

In the practice of this invention, the said starch is typically composed of amylose units and amylopectin units in a ratio of about 15/85 to about 35/65, alternatively about 20/80 to about 30/70, and has a softening point according to ASTM No. D1228 in a range of about 180° C. to about 220° C.; and the starch/plasticizer composite has a softening point in a range of about 110° C. to about 170° C. according to ASTM No. D1228.

For the starch/plasticizer composite, in general, starch to plasticizer weight ratio is in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

In practice, it is desired that the synthetic plasticizer itself is compatible with the starch, and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

For the purposes of this invention, the plasticizer effect for the starch/plasticizer composite, (meaning a softening point of the composite being lower than the softening point of the starch), can be obtained through use of a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated, hydrolysed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can conventionally be obtained in powder and in pellet forms at different molecular weights and crystallinities such as, for example, a molecular weight of about 11700 with an average particle size of about 11.5 microns or a molecular weight (weight average) of about 60,000 with an average particle diameter of less than 50 microns.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled "A Polymer Composition Including Destructured Starch An Ethylene Copolymer", U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an "esterification condensation reaction". Such esterification reactions are well known to those skilled in such art.

A particular feature of this invention is the utilization of the starch composite as a significant component of the elastomer reinforcement in combination with the prescribed sequential addition of the organosilane disulfide compound (I) and followed by the organosilane polysulfide compound (II) in the preparation of a rubber composition and particularly a vulcanized tire tread.

In one aspect, it has been observed that, when providing an inclusion of the starch composite in an elastomer composition when using the dual, sequential organosilane polysulfide addition process of this invention, a vulcanized hardness of the elastomer dropped while its 300 percent modulus remained relatively high.

As a consequence, it has been observed, in an evaluation of an elastomer composition as illustrated in the Examples herein, that wet traction of a tire tread may be enhanced without appreciably degrading a tire handling property where a starch/plasticizer composite is used together with the dual, sequential, and selective addition of the organosilane disulfide compound (I) and the subsequent addition of the organosilane polysulfide compound (II).

It is believed the practice of using the starch composite for a partial replacement for silica reinforcement in the practice of the process of this invention is novel and a significant departure from past practice.

In one aspect of the invention, optionally a total of about 0.05 to about 5 phr of at least one alkyl alkoxy silane can be thermomechanically mixed in the preparatory mixing stage (s), particularly where said alkyl silane has the formula: R'—Si—(OR)3, where R is a methyl, ethyl, propyl or isopropyl radical and R' is a saturated alkyl radical having from 1 to 18 carbon atoms, or an aryl or saturated alkyl substituted aryl radical having from 6 to 12 carbon atoms. Such aryl or substituted aryl radicals might be, for example, benzyl, phenyl, tolyl, methyl tolyl, and alpha methyl tolyl radicals.

A purpose of the alkyl alkoxy silane is, for example, to improve filler incorporation and compound aging. Representative examples of alkyl silanes are, for example but not intended to be limited to, propyltriethoxysilane, methyltriethoxy silane, hexadecyltriethoxysilane, and octadecyltriethoxysilane.

In practice, as hereinbefore discussed, the organosilane polysulfide compound of formula (II) is added in the lower temperature productive mixing step, or stage, which subsequently liberates free sulfur at the higher temperature experienced during the molding and curing of the resultant rubber composition in which it is contemplated that the silane component of the organosilane polysulfide compound formula (II) reacts with the previously formed silane/silica and silane/starch composite network.

While an actual calculation may necessarily have to be done on an individual basis, depending upon the actual number sulfur atoms in the sulfur bridge as well as other factors, the amount of free sulfur to be added in the productive mixing stage, or step, plus the amount free sulfur liberated via the organosilane polysulfide compound of formula (II) is contemplated to be in a range of about 0.13 to about 4, alternatively about 0.13 to about 2.8, phr. This assumes that from about 40 to about 60 percent of the sulfur of the organosilane polysulfide compound of formula (II) is liberated as free sulfur during the curing step.

In practice, it is preferred that at least one phr of free sulfur and at least one phr of the organosilane polysulfide compound of formula (II) are added in the productive mixing stage.

Vulcanization accelerators are conventionally added in the productive mixing stage. Some vulcanization accelerators are not conventionally considered as being sulfur donors in a sense of liberating free sulfur; it is appreciated that they may be, for example, of the type such as, for example, benzothiazole, alkyl thiuram disulfide, guanidine derivatives and thiocarbamates. Representative of such accelerators are, for example but not limited to, mercapto benzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N diphenylthiourea, dithiocarbamylesulfenamide, N,N diisopropylbezothiozole-2-sulfenamide, zinc-2-mercaptotoluimidazole, dithiobis (N methyl piperazine), dithiobis(N beta hydroxy ethyl piperazine) and dithiobis(dibenzyl amine). Such materials are understood herein to be well known as sulfur vulcanization accelerators for sulfur vulcanizable elastomers to those having skill in the rubber compounding art.

If desired, although not preferred in the practice of this invention, additional conventional sulfur donors may be added in the final, productive mixing stage, so long as the total amount of free sulfur added in the productive mixing stage and free sulfur liberated in the curing stage from the aforesaid organosilane polysulfide and the sulfur donor of this paragraph is in a range of about 0.13 to about 2.8 phr. Representative of such additional sulfur donors are, for example, thiuram and morpholine derivatives. Representative of such materials are, for example, dimorpholine disulfide, dimorpholine tetrasulfide, tetramethyl thiuram tetrasulfide, benzothiazyl-2,N dithiomorpholide, thioplasts, dipentamethylenethiurahexasulfide, and disulfidecaprolactame. Such materials are understood to be well known sulfur donors to those having skill in the rubber compounding art. To the extent that such sulfur donors are added in the productive mixing stage, the amount of free sulfur to be added is correspondingly reduced.

For the filler reinforcement for this invention, silica-based pigments are contemplated which may be used in combination with carbon black.

In one aspect of the invention, it is preferred that the silica-based filler is precipitated silica.

In another aspect of the invention, it is preferred that the silica-based filler is a carbon black having silicon hydroxide on its outer surface.

In further aspect of the invention, it is preferred that the silica-based filler is an aluminosilicate as a co-precipitated combination of silica and aluminum with an aluminum content in a range of about 0.05 to about 10 percent of such silica/aluminum filler composite.

The carbon black having silicon hydroxide on its surface may be prepared, for example, by co-fuming an organosilane and oil at an elevated temperature.

In practice, the reinforcing filler may be comprised of about 15 to about 95 weight percent precipitated silica, alumina, aluminosilicate and/or carbon black containing silicon hydroxide on its surface and, correspondingly, about 5 to about 85 weight percent carbon black.

Where it is desired for the rubber composition, which contains both a starch composite and alumina and/or silica-based filler such as precipitated silica, aluminosilicates and/ or carbon black having silicon hydroxide on its surface, and also carbon black reinforcing fillers, it is often preferable that the weight ratio of such silica-based filler(s) to carbon black is at least 1.1/1 and often at least 3/1, even at least 10/1 and, thus, in a range of about 1.1/1 to about 30/1.

For the aforesaid organosilane disulfide of formula (I) and the organosilane polysulfide of formula (II), representative R2 radicals are alkyl radicals and representative R1 radicals are selected from alkaryl, phenyl and haloaryl radicals.

Thus, in one aspect of the invention, the R2 and R1 radicals are mutually exclusive. Preferably such radicals are alkyl radicals.

Representative examples of such alkyl radicals are methyl, ethyl, n-propyl and n-decyl radicals with the n-propyl radical being preferred.

Representative examples of aralkyl radicals are benzyl and alpha, alpha dimethylbenzyl radicals being preferred if such radicals are to be used.

Representative examples of alkaryl radicals are p-tolyl and p-nonylphenol radicals if such radicals are to be used.

A representative example of a haloaryl radical is a p-chlorophenol radical if such radical is to be used.

Representative examples of organosilane polysulfides of the compound of formula (II) are, for example and not intended to be limiting, are bis(3-trimethoxylsilylpropyl) trisulfide, bis(3-trimethoxylsilylpropyl) tetrasulfide, bis(3-triethoxysilylpropyl) trisulfide, bis(3-triethoxysilylpropyl) tetrasulfide, bis(3-triethoxysilylethyltolylene) trisulfide and bis(3-triethoxysilylethyltolylene)tetrasulfide.

Representative examples of organosilane disulfides of the compound of formula (I) blend are, for example:
2,2'-bis(trimethoxysilylethyl) disulfide;
3;3'-bis(trimethoxysilylpropyl) disulfide;
3,3'-bis(triethoxysilylpropyl) disulfide;
2,2'-bis (triethoxysilylethyl) disulfide;
2,2'-bis (tripropoxysilylethyl) disulfide;
2,2'-bi(tri-sec.butoxysilylethyl) disulfide;
2, 2'-bis (tri-t-butoxyethyl) disulfide;
2,2'-bis (triethoxysilylethyl tolylene) disulfide;
2,2'-bis(trimethoxysilylethyl tolylene) disulfide;
3,3'-bis(triisopropoxypropyl) disulfide;
3,3'-bis(trioctoxypropyl) disulfide;
2,2'-bis(2'-ethylhexoxysilylethyl) disulfide;
2,2'-bis(dimethoxy ethoxysilylethyl) disulfide;
3,3'-bis (methoxyethoxypropoxysilylpropyl) disulfide;
3,3'-bis (methoxy dimethylsilylpropyl) disulfide;
3,3'-bis (cyclohexoxy dimethylsilylpropyl) disulfide;
4,4'-bis(trimethoxysilylbutyl) disulfide;
3,3'-bis(trimethoxysilyl-3-methylpropyl) disulfide;
3,3'-bis (tripropoxysilyl-3-methylpropyl) disulfide;
3,3'-bis (dimethoxy methylsilyl-3-ethylpropyl) disulfide;
3,3'-bis(trimethoxysilyl-2-methylpropyl) disulfide; 3,3'-bis (dimethoxyphenylsilyl-2 -methylpropyl) disulfide; 3,3'-bis (trimethoxysilylcyclohexyl) disulfide; 12,12'-bis (trimethoxysilyldodecyl) disulfide; 12,12'-bis (triethoxysilyldodecyl) disulfide; 18,18'-bis (trimethoxysilyloctadecyl) disulfide; 18,18'-bis (methoxydimethylsilyloctadecyl) disulfide; 2,2-'-bis (trimethoxysilyl-2-methylethyl) disulfide; 2,2'-bis (triethoxysilyl-2-methylethyl) disulfide; 2,2'-bis (tripropoxysilyl-2-methylethyl) disulfide; and 2,2'-bis (trioctoxysilyl -2-methylethyl) disulfide.

In practice, the 3,3'-bis(triethoxysilylpropyl) disulfide is preferred which may also be represented as bis-(3-triethoxysilylpropyl) disulfide.

In the practice of this invention, as hereinbefore pointed out, the rubber composition is comprised of at least one diene-based elastomer, or rubber. Suitable conjugated dienes are isoprene and 1,3-butadiene and suitable vinyl aromatic compounds are styrene and alpha-methylstyrene. Thus, it is considered that the elastomer is a sulfur-curable elastomer. Such diene-based elastomer, or rubber, may be selected, for example, from at least one of cis 1,4-polyisoprene rubber (natural and/or synthetic), and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubbers, cis 1,4-polybutadiene, medium vinyl polybutadiene rubber (35–50 percent vinyl), high vinyl polybutadiene rubber (50–75 percent vinyl), styrene/isoprene copolymers, emulsion polymerization prepared styrene/butadiene/acrylonitrile terpolymer rubber and butadiene/acrylonitrile copolymer rubber.

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

As hereinbefore discussed, the precipitated silicas employed in this invention are precipitated silicas such as, for example, those obtained by the acidification of a soluble silicate, e.g., sodium silicate. Such precipitated silicas are well known to those having skill in such art. Also, as hereinbefore discussed, a variation of aluminosilicate contemplated is obtained by co-precipitating silica and aluminum.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 350, and more usually about 150 to about 300 ml/100 g.

Further, the silica, as well as the aforesaid alumina and aluminosilicate, may be expected to have a CTAB surface area in a range of about 100 to about 220. The CTAB surface area is the external surface area as evaluated by cetyl trimethylammonium bromide with a pH of 9. The method is described in ASTM D 3849 for set up and evaluation. The CTAB surface area is a well known means for characterization of silica.

Mercury surface area/porosity is the specific surface area determined by Mercury porosimetry. For such technique, mercury is penetrated into the pores of the sample after a thermal treatment to remove volatiles. Set up conditions may be suitably described as using a 100 mg sample; removing volatiles during two hours at 105° C. and ambient atmospheric pressure; ambient to 2000 bars pressure measuring range. Such evaluation may be performed according to the method described in Winslow, Shapiro in ASTM bulletin, page39 (1959) or according to DIN 66133. For such an evaluation, a CARLO-ERBA Porosimeter 2000 might be used.

The average mercury porosity specific surface area for the precipitated silica should desirably be in a range of about 100 to 300 m$^2$/g.

A suitable pore size distribution for the silica, alumina and aluminosilicate according to such mercury porosity evaluation is desirably considered herein to be: five percent or less of its pores have a diameter of less than about 10 nm; 60 to 90 percent of its pores have a diameter of about 10 to about 100 nm; 10 to 30 percent of its pores have a diameter of about 100 to about 1000 nm; and 5 to 20 percent of its pores have a diameter of greater than about 1000 nm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations Hi-Sil 210, 243, etc; silicas available from Rhone-Poulenc, with, for example, designation of Zeosil 1165MP, silicas available from Degussa GmbH with, for example, designations VN2 and VN3, etc and silicas commercially available from Huber having, for example, a designation of Hubersil 8745.

Alumina, for the purposes of this invention, are natural and synthetic aluminum oxide (Al2O3). In some cases, alumina has been used for such purpose either alone or in combination with silica. The term "alumina" can be described herein as "aluminum oxide, or Al2O3". Use of alumina in rubber compositions, can be shown, for example, in U.S. Pat. No. 5,116,886 and European Patent publication EPO 631,982 A2.

It is recognized that alumina can be in various forms, namely, acidic, neutral and basic forms. Generally, it is considered herein that the neutral form may be preferred.

Aluminosilicates, for the purpose of this invention, can be used as natural materials or synthetically prepared, particularly the co-precipitated silica and aluminum. For example, see U.S. Pat. No. 5,723,529.

In general, the term "aluminosilicates" can be described as "natural or synthetic materials where the silicon atoms of a silicon dioxide are partially replaced, or substituted, either naturally or synthetically, by aluminum atoms". For example, about 5 to about 90, alternatively about 10 to about 80 percent of silicon atoms of a silicon dioxide might be replaced, or substituted, naturally or synthetically, by aluminum atoms to yield an aluminosilicate. A suitable process for such preparation might be described, for example, as by a co-precipitation by pH adjustment of a basic solution, or mixture, of silicate and aluminate also, for example, by a chemical reaction between SiO2, or silanols on the surface of a silicon dioxide, and NaAlO2. For example, in such co-precipitation process, the synthetic co-precipitated aluminosilicate may have about 5 to about 95 of its surface composed of silica moieties and, correspondingly, about 95 to about 5 percent of its surface composed of aluminum moieties.

Examples of natural aluminosilicates are, for example, Muscovite, Beryl, Dichroite, Sepiolite and Kaolinite. Examples of synthetic aluminosilicates are, for example, Zeolite and those which might be represented by formulas such as, for example, [(Al2O3)x.(SiO2)y.(H2O)z]; [(Al2O3)x.(SiO2)y.MO]; where M is magnesium or calcium. Use of aluminosilicates in rubber compositions, can be shown, for example, in U.S. Pat. No. 5,116,886, European Patent publication EPO 063,982 A2, *Rubber Chem. Tech.*, Volume 50, page 606 (1988) and Volume 60, page 84 (1983).

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s) for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include, for example, elemental sulfur (free sulfur) or sulfur donating vulcanizing agents, for example, an amine disulfide, polymeric polysulfide or sulfur olefin adducts which are conventionally added in the final, productive, rubber composition mixing step. Preferably, in most cases, the sulfur vulcanizing agent is elemental sulfur. As known to those skilled in the art, sulfur vulcanizing agents are used, or added in the productive mixing stage, in an amount ranging from about 0.4 to about 3 phr, or even, in some circumstances, up to about 8 phr, with a range of from about 1.5 to about 2.5, sometimes from 2 to 2.5, being usually preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

Sulfur vulcanizable rubber mixtures containing starch/plasticizer composite and precipitated silica reinforcement were prepared and reported herein as experiments, or Samples, Ex 1, Ex 2 and Ex 3.

In particular, for Ex 1 as a control, an organosilane tetrasulfide compound (II), namely bis-(3-ethoxysilylpropyl) tetrasulfide compound, containing having an average of about 3.8 sulfur atoms in its polysulfidic bridge is mixed with the rubber composition in a preparatory, non-productive, mixing stage in an internal rubber mixer.

In particular, for Ex 2, also somewhat as a control, an organosilane disulfide compound, bis-(3-ethoxysilylpropyl) disulfide of formula (I), having an average of about 2.2 sulfur atoms in its polysulfidic bridge is mixed with the rubber composition in a preparatory, non-productive, mixing stage in an internal rubber mixer.

Finally, and in accordance with this invention for Ex 3, an organosilane disulfide compound, bis-(3-ethoxysilylpropyl) disulfide of formula (I), having an average of about 2.2 sulfur atoms in its polysulfidic bridge is mixed with the rubber composition and reinforcing fillers in a preparatory, non-productive mixing stage after which, in a subsequent productive mixing stage, an organosilane tetrasulfide compound, bis-(3-ethoxysilylpropyl) tetrasulfide of formula (II), having an average of about 3.8 sulfur atoms in its polysulfidic bridge, as well as a small amount of free sulfur and vulcanizing accelerator(s)are mixed with the rubber composition in a final, productive mixing stage in an internal rubber mixer.

In particular, for Sample Ex 3 which is intended to be exemplary of this invention, 6.64 phr of the organosilane disulfide material formula (I) are added in the preparatory, non-productive mixing stage, and one phr of the organosilane polysulfide formula (II), and 1.4 phr of sulfur are added in the productive mixing stage.

Therefore, for the productive mixing stage, the calculated sulfur added (based upon 50 percent of the sulfur atoms in the polysulfidic bridge of the organosilane polysulfide formula (II), is 1.4 phr (free sulfur) plus 0.13 phr (from the polysulfide) to equal 1.53 phr. It is to be appreciated that the actual sulfur may differ somewhat from the calculated sulfur, depending upon the amount of sulfur released from the organosilane polysulfide formula (II).

After each mixing step the rubber mixture was batched off on a mill, mill mixed for a short period of time, and slabs of rubber removed from the mill and allowed to cool to a temperature of about 30° C. or lower.

Rubber compositions containing the materials referenced in Table 1 were prepared in a BR Banbury mixer using three separate stages of addition (mixing), namely, two preparatory mix stages and one final mix stage to temperatures of 170° C., 160° C. and 120° C. and times of about 8 minutes, two minutes and two minutes, respectively, for the three overall mix stages. The amounts of the organosilane tetrasulfide and organosilane disulfide are listed as being "variable" in Table 1 and are more specifically set forth in Table 2.

TABLE 1

(Tread)

|  | Parts |
| --- | --- |
| Non-Productive Mix Stages | |
| Isoprene/Butadiene Rubber[1] | 90 |
| Cis 1,4-polybutadiene rubber[2] | 10 |
| Processing Aids[3] | 12 |
| Fatty Acid[4] | 1.5 |

TABLE 1-continued (Tread)

|  | Parts |
| --- | --- |
| Starch/plasticizer composite[5] | 8 |
| Silica[6] | 58 |
| Organosilane disulfide (A)[7] | Variable |
| Organosilane polysulfide (B)[8] | Variable |
| Productive Mix Stage | |
| Sulfur[9] | Variable |
| Zinc Oxide | 2.2 |
| Antioxidant(s)[10] | 2.5 |
| Sulfenamide & Guanidine Type Accelerators | 3.5 |
| Organosilane Polysulfide (B)[8] | Variable |

[1]Isoprene/butadiene (50/50 isoprene/butadiene) copolymer elastomer having a Tg of about −44° C. obtained from The Goodyear Tire & Rubber Company.
[2]Cis 1,4-polybutadiene elastomer obtained as BUDENE ® 1207 from The Goodyear Tire & Rubber Company.
[3]Oil.
[4]Primarily stearic acid.
[5]Obtained as Mater Bi 1128RR from the Novamont company as a composite of starch and polyvinylalcohol plasticizer with a ratio of starch to plasticizer of about 60/40.
[6]Zeosil 1165 MP from Rhone Poulenc.
[7]A composite commercially available from Degussa GmbH as X266S in a form of a 50/50 blend, or composite, of Si266 (trademark of Degussa) and carbon black. The Si266 is a bis-(3-triethoxysilylpropyl) disulfide compound understood to have an average of about 2.2 sulfur atoms in its polysulfidic bridge. Thus, the composite contains 50 percent of the coupling agent.
[8]A composite commercially available from Degussa GmbH as X50S in a form of a 50/50 blend of Si69, a trademark of Degussa GmbH, or what might be referred to as bis-(3-triethoxysilylpropyl) tetrasulfide compound having an average of about 3.8 sulfur atoms in its polysulfide bridge, with carbon black and, thus, the tetrasulfide is considered as being 50% of the composite and, therefore, 50% active.
[9]Obtainable as an S8 elemental sulfur from the Kali Chemie company of Germany.
[10]A phenylene diamine type.

The rubber compositions were cured (vulcanized) by heating for about 18 minutes to a temperature of about 150° C. The addition of the organosilane disulfide compound, organosilane tetrasulfide compound and free sulfur and corresponding physical properties are shown in the following Table 2.

TABLE 2

| Sample # | Ex 1 | Ex 2 | Ex 3 |
| --- | --- | --- | --- |
| Non-Productive Mixing | | | |
| Organosilane Polysulfide (B) | 12.1 | 0 | 0 |
| Organosilane Disulfide (A) | 0 | 12.1 | 11.8 |
| Productive Mixing | | | |
| Sulfur | 1.4 | 2 | 1.4 |
| Organosilane Polysulfide (B) | 0 | 0 | 2 |
| Physical Properties | | | |
| Mooney[1] | 52 | 49 | 45 |
| Rheometer (150° C.) | | | |
| Delta Torque | 28.4 | 32.4 | 29.7 |
| $T_{90}$, (minutes) | 13.8 | 14.2 | 13.6 |
| Stress-Strain | | | |
| Tensile Strength, MPa | 14.9 | 14.3 | 17 |
| Elongation at Break (%) | 397 | 414 | 460 |
| 100% Modulus, MPa | 2.4 | 2.6 | 2.1 |
| 300% Modulus, MPa | 11.3 | 11.2 | 10.7 |
| 300/100 Modulus | 4.9 | 4.5 | 5.0 |

TABLE 2-continued

| Sample # | Ex 1 | Ex 2 | Ex 3 |
|---|---|---|---|
| Rebound | | | |
| 100° C., (%) | 72 | 69 | 70 |
| 23° C., (%) | 45 | 42 | 43 |
| Hardness | | | |
| Shore A | 65 | 67.5 | 62 |

[1]Mooney viscosity (ML-4) at 100° C. of the rubber mixture from the productive mix stage.

In particular, Sample Ex 3 of this invention, when compared to Sample Ex 1 which used the free sulfur generating organosilane tetrasulfide compound (II) in the high temperature non-productive mixing stage(s), clearly shows the advantage of alternatively (1) first adding the non-sulfur generating organosilane disulfide (I) in the non-productive mixing stage for its silane component to react with both the starch composite and the precipitated silica, (2) secondly adding, in the subsequent lower temperature productive mixing stage, the organosilane tetrasulfide compound (II) together with a small amount of free sulfur followed by (3) sulfur vulcanizing the rubber composition.

In particular, the starch composite reinforcement based rubber composition properties of Sample Ex 3 of shows that the addition of the organosilane disulfide compound (A), namely a formula (I) compound, during the non-productive mixing step plus the subsequent controlled addition of the bis-(3-triethoxysilylpropyl) tetrasulfide compound (B), namely a formula (II) compound, in the productive mixing step resulted in substantially increased tensile strength, increased elongation and somewhat increased modulus ratio as compared to Samples Ex 1 and Ex 2- where the organosilane disulfide compound (A) or the organosilane polysulfide compound (B), respectively, was added in the non-productive mixing stage without significantly affecting the hot and cold rebound values.

This is considered as being beneficial because it is considered herein that it is predictive of better treadwear (lower wear) for the rubber composition of Sample Ex 3 of this invention without significantly affecting wet traction and rolling resistance for a tire having a tread of such rubber composition.

Further, it is observed that the reduced Shore A hardness of Sample Ex 3, while still maintaining a high 300 percent modulus, is an indication of reduced filler-to-filler interactions in the rubber composition while still maintaining high elastomer-to-filler interactions. This phenomenon is considered herein as being due to an improved dispersion of silica and starch composite within the elastomer.

The balance of filler-to-filler interaction and elastomer-filler interactions, insofar as the Shore A value and 300 percent modulus values are concerned, is considered herein as being significant and/or beneficial because the creation of the somewhat softer rubber composition (Shore A hardness) while maintaining the stiffness (300 percent modulus) is indicative of a tire having a tread of such composition exhibiting better traction and resistance to skidding on wet surfaces without appreciably affecting tire handling performance.

In addition, the lower Mooney plasticity values of the Samples Ex 2 and Ex 3, compared to Sample Ex 1, as a measure of the viscosity of the rubber mixture, emphasizes the advantage of using the organosilane disulfide compound (A) as compared to using the sulfur liberating organosilane tetrasulfide compound(B) in the non-productive mixing stage, as far as compound processing is concerned.

Therefore, use of the organosilane disulfide compound (B) of formula (I) in the preparatory, non-productive mixing, stage(s), while subsequently and separately adding the organosilane polysulfide compound (B) of formula (II) in the final, productive, mixing stage was observed to significantly improve various rubber composition properties accompanied by improved rubber processing in the non-productive mixing stage(i.e.: lower rubber viscosity).

Accordingly, it is considered herein that it has been shown that, for the starch composite reinforced rubber composition, a combination of mixing the organosilane disulfide compound (B) with elastomer(s) and starch composite and precipitated silica in a preparatory, non-productive mixing stage(s), followed by subsequent addition of a prescribed organosilane tetrasulfide compound (B) in a final, productive, mixing stage at the lower temperature, enhances the physical properties of the cured, or vulcanized, rubber composition. By this preparation of the rubber composition, the silane interaction of a organosilane disulfide compound with a starch composite and silica reinforcement is separated from a liberation of free sulfur as well as further interaction of silane from the subsequently added organosilane tetrasulfide compound (B).

EXAMPLE II

Tires of size 195/65R15 were prepared having treads of the rubber compositions of Exs. 1, 2 and 3 of Example I for their treads. The following results were obtained as shown in Table 3. For this Table, the values for Ex. 1 are normalized to 100 and the values of Ex. 2 and Ex. 3 are normalized to those of Ex. 1; 1 being normalized to a value of 100 and corresponding values for Ex. 2 and Ex 3 being comparatively reported to the Control Ex. 1.

For the normalized values reported in Table 3, a higher value for rolling resistance means lower resistance to rolling so that a higher value is better; a higher value for treadwear means less tread wear so that a higher value is better; and a higher value for wet skid means greater traction and resistance to skidding on a wet surface so that a higher value is better. The tire handling value is a subjective test by a driver of a vehicle with test tire(s) mounted on one or more of its wheels in which a response (behavior) is evaluated to severe maneuver solicitations which might be experienced, for example, during test lane changes at a high vehicular speed. It is considered herein that such test is well known to those having skill in such art.

TABLE 3

| | Ex. 1 | Ex. 2 | Ex. 3 |
|---|---|---|---|
| Rolling Resistance | 100 | 100 | 100 |
| Treadwear | 100 | 97 | 108 |
| Wet skid | 100 | 100 | 102 |
| Tire handling | 100 | 95 | 100 |

This Example demonstrates that a tire with a tread of the rubber composition of Ex. 3 was observed to provide tire better treadwear values (lower wear) than the tires with treads of the rubber composition of Exs. 1 and 2 while not substantially affecting the rolling resistance and slightly increasing the wet skid resistance value without a tire handling drawback.

This is considered herein to be advantageous because the wet skid, the rolling resistance and the compound processing are not affected.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a rubber composition comprises the steps of:

(A) thermomechanically mixing in at least one preparatory mixing stage and to a temperature within a range of about 150° C. to about 185° C. and in the absence of addition of free sulfur (1) 100 parts by weight of at least one diene-based elastomer selected from conjugated diene homopolymers and copolymers and copolymers of at least one conjugated diene and aromatic vinyl compound, (2) about 30 to about 100 phr of particulate filler comprised of (a) about 4 to about 90 weight percent starch/plasticizer composite and, correspondingly, (b) about 96 to about 10 weight percent of at least one additional reinforcing filler selected from carbon black, alumina and silica-based fillers selected from at least one of precipitated silica, aluminosilicate, and modified carbon black containing silicon hydroxide on its surface; wherein said starch is comprised of amylose units and amylopectin units in a ratio of about 15/85 to about 35/65 and has a softening point according to ASTM No. D1228 in a range of about 180° C. to about 220° C. and where said starch/plasticizer composite has a softening point in a range of about 110° C. to about 170° C. according to ASTM No. D1228, and (3) about 0.05 to about 20 parts by weight, per part by weight of said starch/plasticizer composite, alumina and silica based filler, of at least one organosilane disulfide compound of the formula (I):

Z-R1—Sn—R1-Z (I)

followed by:

B) mixing sulfur and at least one organosilane polysulfide compound of formula (II) therewith in a subsequent mixing step to a temperature within in a range of about 100° C. to about 130° C.:

Z-R1—Sm—R1—Z (II)

wherein, n is a number in a range of from 2 to about 6 and the average for n is within a range of from about 2 to 2.6;

wherein m is a number of from 2 to about 8 and the average for m is within a range of about 3.5 to about 4.5;

wherein Z is selected from the group consisting of:

(Z1)

(Z2)

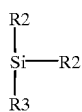 and

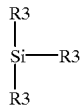

(Z3)

wherein R2 may be the same or different and is individually selected from the group consisting of alkyl group having 1 to 4 carbons and phenyl radicals; R3 may be the same or different and is individually selected from the group consisting of alkyl radicals having 1 to 4 carbon atoms, phenyl, alkoxy radicals having 1 to 8 carbon atoms and cycloalkoxy radicals with 5 to 8 carbon atoms groups; and R1 is selected from the group consisting of a substituted or unsubstituted alkyl radicals having a total of 1 to 18 carbon atoms and a substituted or unsubstituted aryl radicals having a total of 6 to 12 carbon atoms.

2. The process of claim 1 wherein said starch/plasticizer composite has a starch to plasticizer weight ratio in a range of about 0.5/1 to about 4/1, and wherein for said mixing step (B) the total of free sulfur addition and about fifty percent of the sulfur in the polysulfidic bridge of said polysulfide compound is in a range of about 0.93 to about 4 phr.

3. The process of claim 1 wherein said plasticizer is selected from at least one of poly(ethylenevinyl alcohol), cellulose acetate and diesters of dibasic organic acids having a softening point of less than 160° C. and sufficiently below the softening point of the starch with which they are being combined so that the starch/plasticizer composite has a softening point in a range of about 110° C. to about 170° C.

4. The process of claim 1 wherein the organosilane component of said organosilane disulfide compound (I) is reacted during said preparatory mixing stage(s) with the starch composite and hydroxyl groups of at least one of said aluminosilicate, precipitated silica and modified carbon black to form a silane-based composite thereof; wherein said subsequently added organosilane polysulfide interacts with the said previously formed silane-based composite and liberates free sulfur in a subsequent vulcanization of the rubber composition at a temperature in a range of about 140° C. to about 190° C.

5. The process of claim 1 wherein said preparatory mixing is conducted in at least two internal mixing steps for a total internal mixing time for said preparatory (non-productive) mixing steps in a range of about four to about 15 minutes and the mixing time for said subsequent (productive) internal mixing step is in a range of about one to about three minutes, and wherein between each mixing step the rubber composition is mixed on an open roll mill for about two to about six minutes and thereafter allowed to cool to a temperature below about 40° C.; wherein said organosilane disulfide compound (I) and organosilane polysulfide compound (II) are bis-(3-alkoxysilylalkyl) polysulfide compounds in which the alkyl radicals of the alkoxy component are selected from methyl and ethyl radicals and the alkyl radical of the silylalkyl component is selected from ethyl, propyl and butyl radicals.

6. The process of claim 1 wherein said organosilane disulfide compound (I) and organosilane polysulfide compound (II) are bis-(3-alkoxysilylalkyl) polysulfide compounds in which the alkyl radicals of the alkoxy component are selected from methyl and ethyl radicals and the alkyl radical of the silylalkyl component is selected from ethyl, n-propyl and butyl radicals.

7. The process of claim 1 wherein said organosilane disulfide compound (I) and said organosilane polysulfide compound (II) are individually added in a form of individual composites comprised of about 25 to about 75 weight percent thereof and, correspondingly, about 75 to about 25 weight percent of particulate carbon black.

8. The process of claim 1 wherein said particulate reinforcement is comprised of (a) said starch composite and (b) said at least one precipitated silica, aluminosilicate and said modified carbon black; wherein said aluminosilicate is prepared by a co-precipitation of silicate and aluminum electrolytes to form a silica/aluminum composite which contains from about 5 to about 95 weight percent aluminum, and wherein said modified carbon black is prepared by reacting an organosilane and carbon black at an elevated temperature of by co-fuming an organosilane and oil at an elevated temperature.

9. The process of claim 4 wherein said particulate reinforcement is comprised of (a) said starch composite and (b) said at least one precipitated silica, aluminosilicate and said modified carbon black; wherein said aluminosilicate is prepared by a co-precipitation of silicate and aluminum electrolytes to form a silica/aluminum composite which contains from about 5 to about 95 weight percent aluminum, and wherein said modified carbon black is prepared by reacting an organosilane and carbon black at an elevated temperature of by co-fuming an organosilane and oil at an elevated temperature.

10. The process of claim 9 wherein a total of about 0.05 to about 5 phr of at least one alkyl silane is added to said preparatory thermomechanical mixing step(s); wherein said alkyl silane has the formula (III):

$$R'\text{-}Si\text{-}(OR'')_3 \qquad (III)$$

R'' is selected from at least one of methyl, ethyl, propyl and isopropyl radicals and R' is a saturated alkyl having from 1 to 18 carbon atoms or aryl or saturated alkyl substituted aryl radical having from 6 to 12 carbon atoms.

11. The process of claim 10 wherein said alkyl alkoxy silane is selected from at least one of propyltriethoxy silane, methyltriethoxy silane, hexadecyltriethoxy silane and octadecyltriethoxy silane.

12. The process of claim 1 where, for said diene-based elastomer, said conjugated dienes are selected from isoprene and 1,3-butadiene and said vinyl aromatic compounds are selected from styrene and alpha-methylstyrene.

13. The process of claim 1 where said diene-based elastomer is selected from at least one of natural and synthetic cis 1,4-polyisoprene rubber, emulsion polymerization prepared styrene/butadiene copolymer rubber, organic solution polymerization prepared styrene/butadiene copolymer rubber, 3,4-polyisoprene rubber, isoprene/butadiene rubber, styrene/isoprene/butadiene terpolymer rubbers, cis 1,4-polybutadiene rubber, medium vinyl polybutadiene rubber (35–50 percent vinyl), high vinyl polybutadiene (50–90 percent vinyl) and emulsion polymerization prepared styrene/butadiene/acrylonitrile terpolymer rubber and butadiene/acrylonitrile copolymer rubber.

14. The process of claim 1 wherein said organosilane disulfide for said organosilane disulfide compound is selected from at least one of:

2,2'-bis(trimethoxysilylethyl) disulfide;
3,3'-bis(trimethoxysilylpropyl) disulfide;
3,3'-bis(triethoxysilylpropyl) disulfide;
2,3'-bis(triethoxysilylethyl) disulfide;
2,2'-bis(tripropoxysilylethyl) disulfide;
2,2'-bis(tri-sec.butoxysilylethyl) disulfide;
3,3'-bis (tri-t-butoxyethyl) disulfide;
3,3'-bis(triethoxysilylethyl tolylene) disulfide;
3,3'-bis(trimethoxysilylethyl tolylene) disulfide;
3,3'-bis(triisopropoxypropyl) disulfide;
3,3'-bis(trioctoxypropyl) disulfide;
2,2'-bis(2'-ethylhexoxysilylethyl) disulfide;
2,2'-bis(dimethoxy ethoxysilylethyl) disulfide;
3,3'-bis(methoxyethoxypropoxysilylpropyl) disulfide;
3,3'-bis(methoxy dimethylsilylpropyl) disulfide;
3,3'-bis(cyclohexoxy dimethylsilylpropyl) disulfide;
4,4'-bis(trimethoxysilylbutyl) disulfide;
3,3'-bis(trimethoxysilyl-3-methylpropyl) disulfide;
3,3'-bis (tripropoxysilyl-3-methylpropyl) disulfide;
3,3'-bis (dimethoxy methylsilyl-3-ethylpropyl) disulfide;
3,3'-bis(trimethoxysilyl-2-methylpropyl) disulfide;
3,3'-bis (dimethoxyphenylsilyl-2-methylpropyl) disulfide;
3,3'-bis (trimethoxysilylcyclohexyl) disulfide;
12,12'-bis (trimethoxysilyldodecyl) disulfide;
12,12'-bis (triethoxysilyldodecyl) disulfide;
18,18'-bis (trimethoxysilyloctadecyl) disulfide;
18,18'-bis (methoxydimethylsilyloctadecyl) disulfide;
2,2-'-bis (trimethoxysilyl-2-methylethyl) disulfide;
2,2'-bis (triethoxysilyl-2-methylethyl) disulfide;
2,2'-bis (tripropoxysilyl-2-methylethyl) disulfide; and
2,2'-bis(trioctoxysilyl-2-methylethyl) disulfide; and wherein said organosilane polysulfide for said organosilane polysulfide (II) is selected from at least one of bis-(3-trimethoxylsilylpropyl) trisulfide, bis-(3-trimethoxylsilylpropyl) tetrasulfide, bis-(3-triethoxysilylpropyl) trisulfide, bis-(3-triethoxysilylpropyl) tetrasulfide, bis-(3-triethoxysilylethyltolylene) trisulfide and bis-(3-triethoxysilylethyltolylene)tetrasulfide.

15. The process of claim 1 wherein said organosilane disulfide for said organosilane disulfide compound (I) is 3,3'-bis(triethoxysilylpropyl) disulfide.

16. The process of claim 1 wherein said organosilane disulfide for said organosilane disulfide compound (I) is 3,3'-bis(triethoxysilylpropyl) disulfide, and wherein said organosilane polysulfide for said organosilane polysulfide compound (II) is selected from at least one of bis-(3-trimethoxylsilylpropyl) trisulfide, bis-(3-trimethoxylsilylpropyl) tetrasulfide, bis-(3-triethoxysilylpropyl) trisulfide, bis-(3-triethoxysilylpropyl) tetrasulfide, bis-(3-triethoxysilylethyltolylene) trisulfide and bis-(3-triethoxysilylethyltolylene)tetrasulfide.

17. The process of claim 1 which comprises an additional step of sulfur vulcanizing the resulting mixed rubber composition at a temperature in a range of from about 140° C. to about 190° C.

18. The process of claim 17 wherein, for said mixing step (B) the total of free sulfur addition and about fifty percent of the sulfur in the polysulfidic bridge of said polysulfide compound is in a range of about 0.93 to about 2.8 phr.

19. The process of claim 1 which comprises the additional steps of shaping said rubber composition to form a tire tread stock, applying said tire tread stock to a rubber tire carcass to form an assembly thereof and molding and vulcanizing said assembly in a suitable mold to form a tire, and wherein for said mixing step (B) the total of free sulfur addition and about fifty percent of the sulfur in the polysulfidic bridge of said polysulfide compound is in a range of about 0.93 to about 4 phr.

20. The process of claim 3 which comprises the additional steps of shaping said rubber composition to form a tire tread stock, applying said tire tread stock to a rubber tire carcass to form an assembly thereof and molding and vulcanizing said assembly at a temperature in a range of about 140° C. to about 190° C. to form a tire, and wherein, for said mixing step (B) the total of free sulfur addition and about fifty percent of the sulfur in the polysulfidic bridge of said polysulfide compound is in a range of about 0.93 to about 4 phr.

* * * * *